United States Patent
Wong et al.

(10) Patent No.: US 10,320,291 B2
(45) Date of Patent: Jun. 11, 2019

(54) CONTROL CIRCUIT AND DEVICE WITH EDGE COMPARISON FOR SWITCHING CIRCUIT

(71) Applicant: Joulwatt Technology (Hangzhou) Co., Ltd., Hangzhou (CN)

(72) Inventors: Pitleong Wong, Hangzhou (CN); Feng Xu, Hangzhou (CN); Siopang Chan, Hangzhou (CN); Yuancheng Ren, Hangzhou (CN); Xunwei Zhou, Hangzhou (CN)

(73) Assignee: Joulwatt Technology (Hangzhou) Co., Ltd., Hangzhou (CN)

( * ) Notice: Subject to any disclaimer, the term of this patent is extended or adjusted under 35 U.S.C. 154(b) by 0 days.

(21) Appl. No.: 15/693,136

(22) Filed: Aug. 31, 2017

(65) Prior Publication Data

US 2018/0062511 A1    Mar. 1, 2018

(30) Foreign Application Priority Data

Aug. 31, 2016   (CN) .......................... 2016 1 0790138

(51) Int. Cl.
*H02M 3/156*    (2006.01)
*H02M 3/157*    (2006.01)
*H02M 1/00*     (2006.01)

(52) U.S. Cl.
CPC .......... *H02M 3/156* (2013.01); *H02M 3/157* (2013.01); *H02M 2001/0012* (2013.01)

(58) Field of Classification Search
CPC .......................................... H02M 3/155–1588
See application file for complete search history.

(56) References Cited

U.S. PATENT DOCUMENTS

| | | | | | |
|---|---|---|---|---|---|
| 4,860,184 A | * | 8/1989 | Tabisz | ................... | H02M 3/155 363/17 |
| 4,975,823 A | * | 12/1990 | Rilly | ..................... | H02M 3/338 363/21.16 |
| 5,991,171 A | * | 11/1999 | Cheng | ............... | H02M 3/33507 363/21.03 |

(Continued)

FOREIGN PATENT DOCUMENTS

| | | |
|---|---|---|
| CN | 103066823 U | 4/2013 |
| CN | 105450023   | 3/2016 |
| CN | 105763053 A | 7/2016 |

(Continued)

*Primary Examiner* — Kyle J Moody
*Assistant Examiner* — Peter M Novak
(74) *Attorney, Agent, or Firm* — Treasure IP Group, LLC

(57) ABSTRACT

A control method, a control circuit and a device for a switching circuit are disclosed, for fixing a frequency of the switching circuit when the switching circuit is operated under CCM. The present disclosure is suitable to various switching circuits, and an application scope of the control method of the switching circuit can be extended. The control method comprises: starting measuring time at a rising edge of a turn-on signal of the first switch; reducing a turn-on time or a turn-off time of the first switch when a first measured time is reached, and the rising edge in a next cycle of the turn-on signal has not arrived; increasing the turn-on time or the turn-off time of the first switch when the rising edge in the next cycle of the turn-on signal arrives but the first measured time is not reached.

12 Claims, 8 Drawing Sheets

(56) References Cited

U.S. PATENT DOCUMENTS

2016/0105108 A1* 4/2016 Childs ................ H02M 3/1588
                                                                                           323/271
2017/0288537 A1* 10/2017 Jing ..................... H02M 1/08

FOREIGN PATENT DOCUMENTS

| CN | 205792242 U | 12/2016 |
| CN | 205847092 U | 12/2016 |

\* cited by examiner

CONTROL CIRCUIT AND DEVICE WITH EDGE COMPARISON FOR SWITCHING CIRCUIT

CROSS-REFERENCE TO RELATED APPLICATION

This application claims the benefit of Chinese Patent Application No. 201610790138.5, filed on Aug. 31, 2016, which is incorporated herein by reference in its entirety.

BACKGROUND OF THE DISCLOSURE

Field of the Disclosure

The present disclosure relates to the technical field of circuits, and more particularly, to a control method, a control circuit and a device for a switching circuit.

Background of the Disclosure

At present, a switching circuit (such as a buck circuit which is used to obtain a voltage drop) is a common circuit used in circuit design, for example, as shown in FIG. 1, a buck circuit generally comprises a first switch 1', a second switch 2' and an inductor 3', wherein the first switch 1' may be a MOSFET (Metal Oxide Semiconductor Field Effect Transistor), the second switch 2' may be a freewheel diode or a synchronous rectifier, Vin' is an input voltage of the buck circuit, Vout' is an output voltage of the buck circuit, TON' is a turn-on signal of the first switch 1'. As shown in FIG. 2, when the switching circuit is operated under CCM (Continuous Conduction Mode), in an operating cycle of the switching circuit, a current I' through the inductor increases to its maximum value when the turn-on signal TON' of the first switch 1' is at high level (i.e., the first switch 1' is turned on), the current I' through the inductor decreases to its minimum value when the turn-on signal BON' of the second switch is at high level (i.e., the second switch 2' is turned on), and then the waveform of this operating cycle is repeated after the first switch 1' in the next operating cycle is turned on again, wherein, the minimum value of the current through the inductor is larger than 0A, the current I' through the inductor is kept to be continuously flowing, that is, the switching circuit is operated under CCM (Continuous Conduction Mode) all along. Herein the abscissa of the waveforms corresponding to the signals shown in FIG. 2 represents time t'. According to FIG. 2, it can be known that the cycle of the turn-on signal TON' of the first switch 1' is a sum of a turn-on time and a turn-off time of the first switch 1' in one operating cycle. Furthermore, it should be noted that, when the switching circuit is operated under CCM, the rising edge of the turn-on signal TON' of the first switch 1' and the falling edge of the turn-on signal BON' of the second switch 2' arrives at the same time, the falling edge of the turn-on signal of the first switch 1' and the rising edge of the turn-on signal of the second switch 2' arrives at the same time.

Furthermore, the control method for the switching circuit can be in a constant on-time control mode or a constant off-time control mode, wherein the constant on-time control mode is to control the switching circuit by controlling the turn-on time of the first switch 1', and the constant off-time control mode is to control the switching circuit by controlling the turn-off time of the first switch P. The constant on/off time (COT) control modes have advantages of excellent load transient performance, simple inner structure and smooth switching between operating modes, these advantages work well in the field of power supplies.

However, the buck circuit in the prior art operated under CCM and working in the constant on-time control mode or the constant off-time control mode cannot realize a function for fixing a frequency, that is, cannot keep a switching frequency of the first switch 1' at a constant value.

SUMMARY OF THE DISCLOSURE

An objective of the present invention is to provide a control method, a control circuit and a device for a switching circuit, for realizing a function of fixing a frequency of the switching circuit which is operated under CCM, thus the application scope of the control method of the switching circuit is increased.

To achieve the above objective, technical schemes adopted in the control method of the switching circuit provided by the present invention are as follows.

According to a first aspect, the disclosure provides a control method for a switching circuit, the control method is used in the switching circuit operated under continuous conduction mode, the switching circuit comprises a first switch, which transforms an input voltage into an output voltage for driving loads by turning the first switch on and off, the control method comprises: starting time measuring at a rising edge of a turn-on signal of the first switch; when a first measured time is reached, if the rising edge in a next cycle of the turn-on signal has not arrived, reducing a turn-on time or a turn-off time of the first switch for fixing a frequency of the switching circuit; when the rising edge in the next cycle of the turn-on signal has arrived before the first measured time is reached, increasing the turn-on time or the turn-off time of the first switch for fixing the frequency of the switching circuit.

According to a second aspect, the disclosure further provides a control method for a switching circuit, the control method is used in the switching circuit operated under continuous conduction mode, the switching circuit comprises a first switch, which transforms an input voltage into an output voltage for driving loads by turning the first switch on and off, the control method comprises: starting time measuring at a falling edge of a turn-on signal of the first switch; when a first measured time is reached, if the falling edge in a next cycle of the turn-on signal has not arrived, reducing a turn-on time or a turn-off time of the first switch for fixing a frequency of the switching circuit; when the falling edge in the next cycle of the turn-on signal has arrived before the first measured time is reached, increasing the turn-on time or the turn-off time of the first switch for fixing the frequency of the switching circuit.

According to a third aspect, the disclosure further provides a control circuit for a switching circuit, the control circuit is used in the switching circuit operated under the continuous conduction mode, wherein the switching circuit comprises a first switch and transforms an input voltage into an output voltage for driving loads by turning the first switch on and off, and the control circuit comprises: a timing module, which starts time measuring at a rising edge of a turn-on signal of the first switch; a regulation module, which is connected with the timing module, used to reduce a turn-on time or a turn-off time of the first switch for fixing a frequency of the switching circuit when a first measured time is reached and the rising edge in a next cycle of the turn-on signal has not arrived, and used to increase the turn-on time or the turn-off time of the first switch for fixing the frequency of the switching circuit when the rising edge in the next cycle of the turn-on signal has arrived before the first measured time is reached.

Preferably, the timing module comprises a second switch, a second capacitor, a second voltage comparator and a second current source, a control terminal of the second switch receives the turn-on signal of the first switch, a first terminal of the second switch is grounded, a second node is a node connected with a second terminal of the second switch; the second node is coupled with the second current source, a first input terminal of the second voltage comparator and a first terminal of the second capacitor, respectively, a second terminal of the second capacitor is grounded, a voltage of a second input terminal of the second voltage comparator is a first reference voltage, wherein the first reference voltage is the same with a voltage of the second node at the time when the first measured time is equal to a predetermined time of a switching cycle of the turn-on signal of the first switch.

Preferably, the regulation module comprises an edge comparator which has a first input terminal connected with an output terminal of the second voltage comparator and a second input terminal receiving the turn-on signal of the first switch.

Preferably, wherein the regulation module further comprises an on-time regulating unit and an on-time controlling unit, wherein the on-time regulating unit is connected with the edge comparator and an output current of the on-time regulating unit is adjusted in accordance with an output signal of the edge comparator, the on-time controlling unit is coupled with the on-time regulating unit and an output signal of the on-time controlling unit is adjusted in accordance with the adjusted output current of the on-time regulating unit.

Preferably, the edge comparator comprises a first output terminal and a second output terminal, the on-time regulating unit comprises a third switch, a third current source, a fourth switch, a fourth current source, a third capacitor and a voltage-to-current transforming subunit, a control terminal of the third switch is connected with the first output terminal of the edge comparator, a first terminal of the third switch is connected with the third current source, a third node is a node connected with a second terminal of the third switch, a control terminal of the fourth switch is connected with the second output terminal of the edge comparator, a first terminal of the fourth switch is grounded through the fourth current source, a second terminal of the fourth switch is connected with the third node, a first electrode of the third capacitor is connected with the third node, a second electrode of the third capacitor is grounded, an input terminal of the voltage-to-current transforming subunit is connected with the third node.

Preferably, the on-time controlling unit comprises a fifth switch, a fourth capacitor, and a third voltage comparator, wherein a control terminal of the fifth switch receives the turn-on signal of the first switch, the first terminal of the fifth switch is grounded, a fourth node is a node connected with a second terminal of the fifth switch, the fourth node is connected with an output terminal of the voltage-to-current transforming subunit, a first input terminal of the third voltage comparator and a first electrode of the fourth capacitor, respectively, a second electrode of the fourth capacitor is grounded, a voltage of a second input terminal of the third comparator is a second reference voltage.

Preferably, the on-time controlling unit further comprises a fifth current source connected with the fourth node, a current of the fifth current source is (M*Vina), the second reference voltage is equal to Vouta, wherein M is a fixed constant, Vina is an input voltage of the switching circuit, Vouta is an output voltage of the switching circuit.

According to a fourth aspect, the disclosure further provides a control circuit for a switching circuit, which is used to control the switching circuit operated under continuous conduction mode, the switching circuit comprises a first switch and transforms an input voltage into an output voltage for driving loads by turning the first switch on and off, the control circuit comprises: a timing module, which starts time measuring at a rising edge of a turn-on signal of the first switch; a regulation module, which is connected with the timing module, used to reduce a turn-on time or a turn-off time of the first switch when a first measured time is reached and the rising edge in a next cycle of the turn-on signal has not arrived, and used to increase the turn-on time or the turn-off time of the first switch when the rising edge in the next cycle of the turn-on signal has arrived before the first measured time is reached.

According to a fifth aspect, the disclosure further provides a device for a switching circuit which includes the control circuit.

Compared with the prior art, the present invention has following beneficial effects: the control method for the switching circuit provided by the embodiment of the present disclosure includes the above steps, so that it is only needed to start time measuring at a rising edge of the turn-on signal of the first switch, to reduce the turn-on time or the turn-off time of the first switch for fixing the frequency of the switching circuit if the rising edge in the next cycle of the turn-on signal of the first switch has not arrived when the first measured time is reached, and to increase the turn-on time or the turn-off time of the first switch for fixing the frequency when the rising edge in the next cycle of the turn-on signal of the first switch has arrived before the first measured time is reached. Therefore, the relationship between the input voltage and the output voltage of the control method for the switching circuit provided by the embodiment of the present disclosure is not required to satisfy specific conditions for fixing the frequency of the switching circuit, which extends the application scope of the control method for the switching circuit provided by the embodiment of the present disclosure.

BRIEF DESCRIPTION OF THE DRAWINGS

Those technical solutions according to embodiments of the present disclosure and the prior art will be apparent when they are described in connection with appended drawings which are firstly described briefly hereinbelow. It will obvious to one skilled in the art that the following appended drawings only some embodiments of the present disclosure. Other appended drawings can be obtained from these appended drawings without the need for creative work.

Reference signs are described as follows:
1—timing module; 2—regulation module; 21—edge comparator;
22—on-time regulating unit; 210—voltage-to-current transforming subunit; 23—on-time controlling unit.

DETAILED DESCRIPTION OF THE DISCLOSURE

Those embodiments of the present disclosure will be described clearly and completely in connection with appended drawings. It is apparent that the embodiments described hereinbelow are some but not all of the present disclosure. All of other embodiments, which are obtained by one skilled in the art from the embodiments described hereinbelow without the need for creative work, will fall within the scope of the present disclosure.

A First Embodiment

Figure 1:
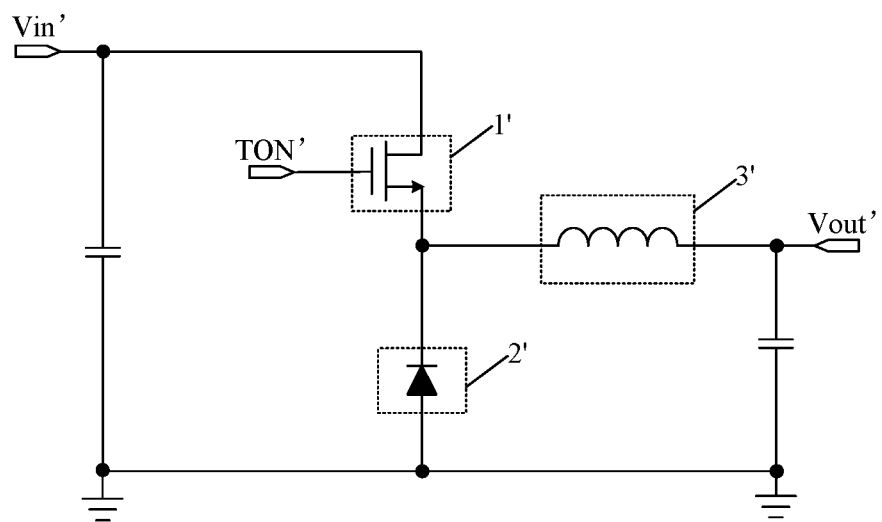
FIG. 1 is a schematic circuit diagram of an example buck circuit according to the prior art.
Figure 2:
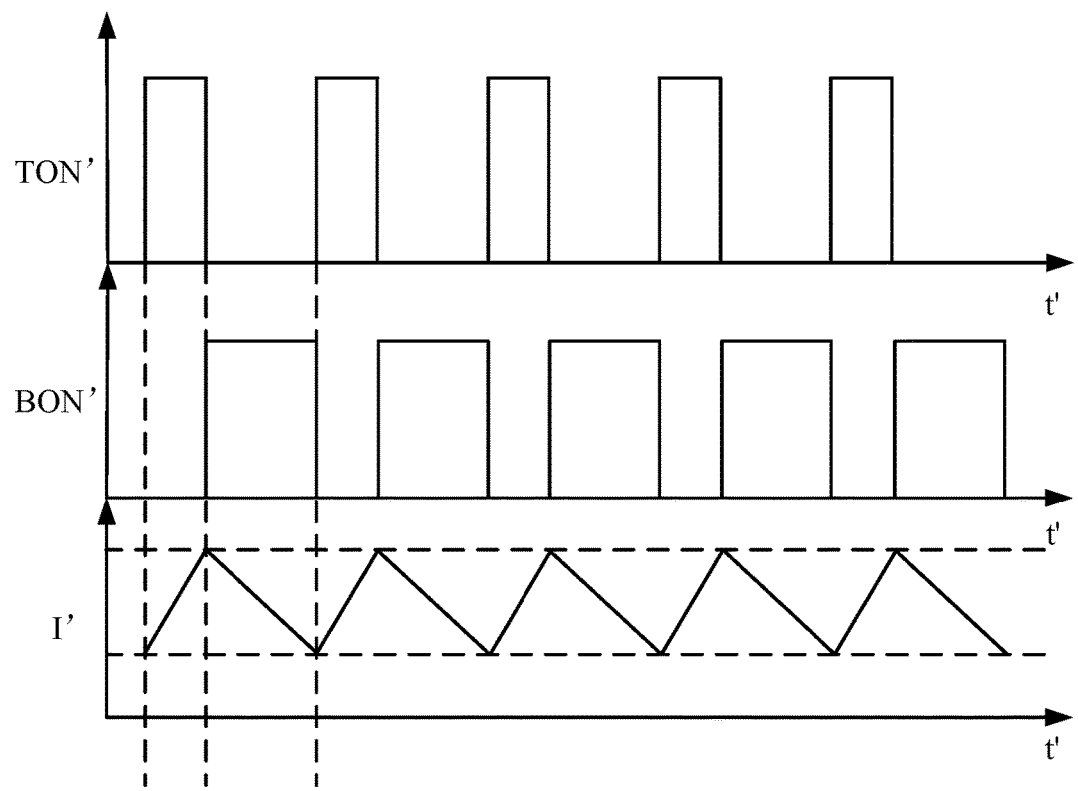
FIG. 2 is a timing diagram of an example buck circuit operated under continuous conductive mode according to the prior art.
Figure 3:
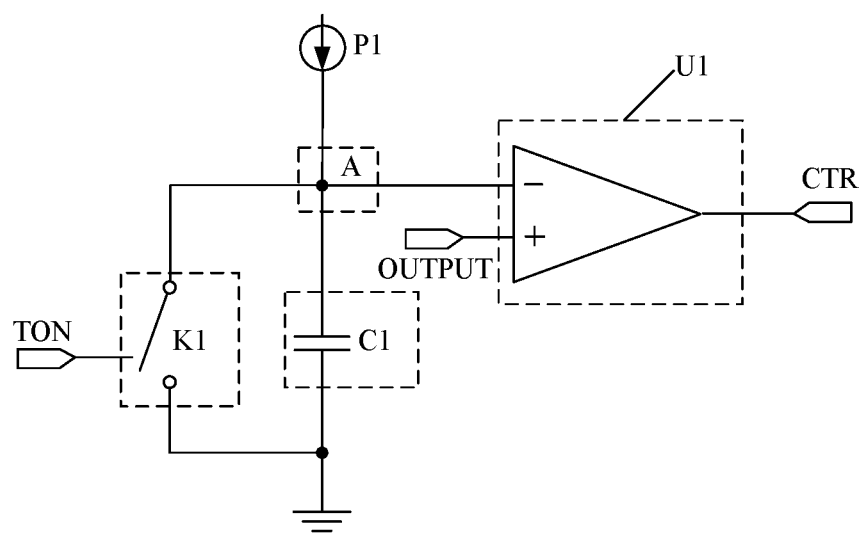
FIG. 3 is a first schematic circuit diagram of a control circuit for a switching circuit according to an embodiment of the disclosure.

For solving the problems described in the background, the embodiment of the disclosure provides a device for a switching circuit, comprising a switching circuit and a control circuit, the control circuit is used to control a buck circuit operated under CCM and working in a constant on-time control mode. Specifically, as shown in FIG. 3, the control circuit comprises a first switch K1, a first capacitor C1, a first current source P1 and a first voltage comparator U1, a control terminal of the first switch K1 receives a turn-on signal TON of the first switch, a first terminal of the first switch K1 is grounded, a node connected with a second terminal of the first switch K1 is marked as a first node A, the first node A is further connected with the first current source P1, a first electrode of the first capacitor C1 and a first input terminal of the first voltage comparator U1, respectively, a second electrode of the first capacitor C1 is grounded, a second input terminal of the first voltage comparator U1 is connected with an output terminal OUTPUT of the buck circuit, an output terminal of the first voltage comparator U1 receives a control signal CTR of the turn-on signal of the first switch, a current I1 of the first current source P1 satisfies the equation I1=M*Vin, wherein M is a fixed constant, Vin is an input voltage of the buck circuit. From the circuit structure described above, it can be known that a voltage of the first node A, a voltage of the first electrode of the first capacitor C1 and a voltage of a first input terminal of the first voltage comparator are the same. For ease of description, the voltage of the first electrode of the first capacitor C1 and the voltage of the first input terminal of the first voltage comparator U1 is represented by the voltage of the first node A below.

In the following description, an operating process of the control circuit with the above circuit structure is described based on an example, in which the first input terminal of the first comparator U1 is an inverting terminal, the second input terminal of the first comparator U1 is a non-inverting terminal, and the first voltage comparator U1 outputs a high-level voltage when a voltage of the non-inverting terminal is higher than a voltage of the inverting terminal. Specifically, before a rising edge of the turn-on signal of the first switch arrives (that is, the first switch is off), the turn-on signal TON of the first switch has turned on the first switch K1, at this time, the first electrode of the first capacitor C1 is grounded, the voltage of the first node A is 0V, the first voltage comparator U1 outputs a high-level voltage. When the rising edge of the turn-on signal of the first switch arrives (that is, the first switch just begins to be conductive), the turn-on signal TON of the first switch turns off the first switch K1, at this time, the first electrode of the first capacitor C1 is off-grounded, the first electrode of the first capacitor C1 is charged by the first current source P1. When the voltage of the first electrode of the first capacitor C1 is equal to the output voltage Vout of the buck circuit, i.e., the voltage of the first input terminal of the first voltage comparator U1 is equal to the voltage of the second input terminal of the first voltage comparator U1, the output signal of the first voltage comparator U1 changes from high level to low level, that is, a falling edge of the output signal of the first voltage comparator U1 arrives, so that the falling edge of the turn-on signal of the first switch can be determined by the control signal CTR of the turn-on signal of the first switch in accordance with the falling edge of the output signal of the first voltage comparator U1, and then a time period during which the turn-on signal of the first switch is at high level can be determined, i.e., the turn-on time of the first switch can be determined.

A switching cycle Ta of the turn-on signal of the first switch determined by the control circuit for the switching circuit with the above circuit structure is calculated as below. From the analysis of the operating process of the control circuit described above, it can be known that the turn-on time of the first switch satisfies the first equation:

$$Ton=(C1\times Vout)/I1=(C1\times Vout)/(M\times Vin)$$

$$=(C1/M)\times(Vout/Vin),$$

wherein, C1 is the capacitance of the first capacitor C1.

Besides, according to the relationship between the input voltage Vin and the output voltage Vout when the buck circuit works in the constant on-time control mode and is operated under CCM, a second equation can be known:

$$Vout=Vin\times(Ton/Ta)$$

According to the combination of the first equation and the second equation, it can be known that Ta=C1/M, i.e., the switching cycle of the turn-on signal of the first switch is constant, which means that the switching frequency of the first switch remains the same, so that a constant frequency of the buck circuit can be implemented when the buck circuit is operated under CCM.

A Second Embodiment

According to the calculation process for obtaining the switching cycle Ta of the turn-on signal of the first switch in the first embodiment, it can be known that the condition for satisfying the second equation by the input voltage Vin of the buck circuit and the output voltage Vout of the buck circuit is to use a buck circuit as the switching circuit, to control the buck circuit in the constant on-time control mode and to operate under CCM. However, besides the buck circuit, the switching circuit can also be a boost circuit, a flyback circuit, a buck-boost circuit or other circuits in different types.

The inventor of the disclosure finds that, when the switching circuit is not a buck circuit, the input voltage and the output voltage of the switching circuit cannot satisfy the second equation, and even if the switching circuit is a buck circuit, when the switching circuit works in the constant off-time control mode and is operated under CCM, the input voltage and the output voltage of the switching circuit cannot satisfy the second equation, either. Therefore, the control circuit for the switching circuit provided by the first embodiment is only suitable to the switching circuit which is a buck circuit and the buck circuit should work in the constant on-time control mode and be operated under CCM, so that the control circuit has a narrow scope of application. Also, because the voltage comparator has a certain flip delay and there're errors generated by the sampling of the input voltage and the output voltage, the implement of the constant frequency of the buck circuit working in the constant on-time control mode doesn't have a good effect by using the method in the first embodiment.

Figure 4:
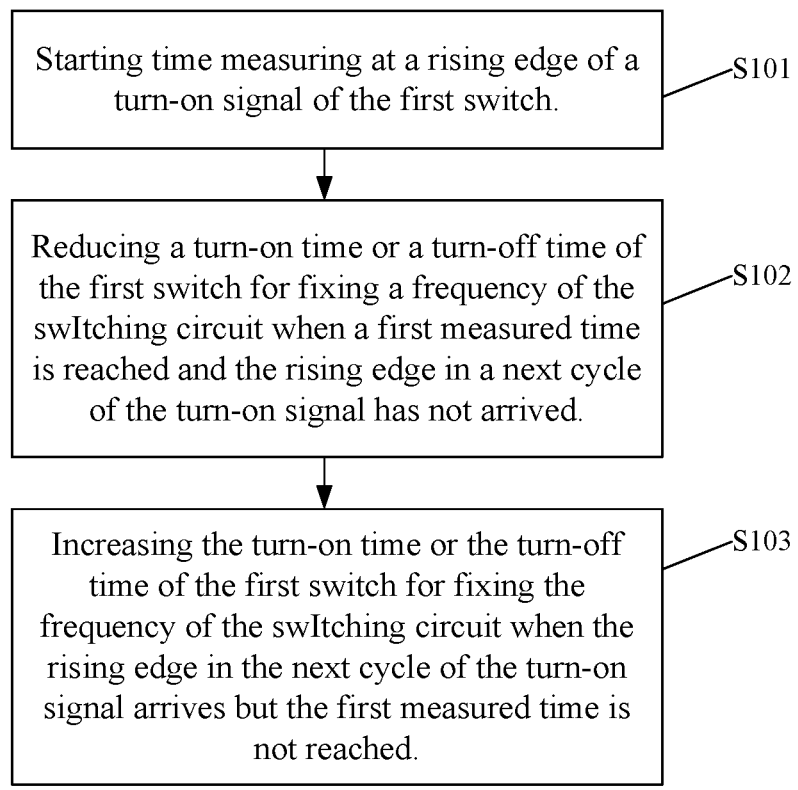
FIG. 4 is a first flow diagram of a control method for a switching circuit according to an embodiment of the disclosure.

For solving the problem described above, the embodiment of the present disclosure provides a control method for the switching circuit, wherein the switching circuit is operated under continuous conduction mode, comprises a first switch and transforms an input voltage into an output voltage for driving a load by turning the first switch on and off. As shown in FIG. 4, the control method comprises: step S101, starting time measuring at a rising edge of a turn-on signal of the first switch; step S201, when a first measured time is reached, if the rising edge in a next cycle of the turn-on signal has not arrived, reducing a turn-on time or a turn-off time of the first switch for fixing a frequency of the switching circuit; step S301, when the rising edge in the next cycle of the turn-on signal has arrived and the first measured time is not reached, increasing the turn-on time or the turn-off time of the first switch for fixing the frequency of the switching circuit. It should be noted that, the frequency of the switching circuit can be fixed by equalizing the switching cycle of the first switch and the first measured time, or by setting the difference between the switching cycle and the first measured time in a certain error range.

The control method for the switching circuit provided by the embodiment of the present disclosure includes the above steps, so that it is only needed to start time measuring at a rising edge of the turn-on signal of the first switch, to reduce the turn-on time or the turn-off time of the first switch for fixing the frequency of the switching circuit if the rising edge in the next cycle of the turn-on signal of the first switch has not arrived when the first measured time is reached, and to increase the turn-on time or the turn-off time of the first switch for fixing the frequency when the rising edge in the next cycle of the turn-on signal of the first switch arrives before the first measured time is reached. Therefore, the relationship between the input voltage and the output voltage of the control method for the switching circuit provided by the embodiment of the present disclosure is not required to satisfy specific conditions for fixing the frequency of the switching circuit, which extends the application range of the control method for the switching circuit provided by the embodiments of the present disclosure. For example, the control method for the switching circuit provided by the embodiments of the present disclosure can fix the frequency of the buck circuit operated under CCM, and can also fix the frequency of the boost circuit operated under CCM.

Furthermore, it is not necessary to obtain the input voltage and the output voltage of the switching circuit according to the control method for the switching circuit for fixing the frequency of the switching circuit, so that there's no need to sample the input voltage and the output voltage of the switching circuit, and the error issue on fixing the frequency caused by the relatively big error generated by the sampling of the input voltage and the output voltage of the switching circuit is not exist, for example, even if the ripple of the input voltage of the switching circuit is large, it will not influence the fixed frequency of the switching circuit, so the control method for the switching circuit according to the embodiments of the present disclosure can fix the frequency of the switching circuit accurately.

Figure 5:
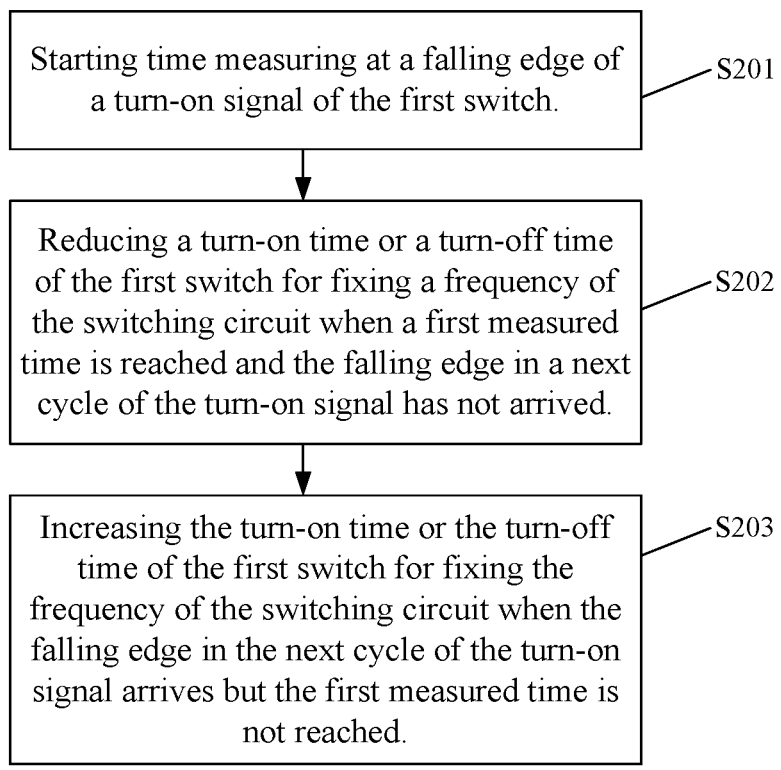
FIG. 5 is a second flow diagram of a control method for a switching circuit according to an embodiment of the disclosure.

Moreover, the embodiment of the present disclosure further provides a control method for the switching circuit, wherein the switching circuit is operated under continuous conduction mode and the switching circuit, which comprises a first switch, transforms an input voltage into an output voltage for driving a load by turning the first switch on and off. As shown in FIG. 5, the control method comprises: step S201, starting time measuring at a falling edge of a turn-on signal of the first switch; step S201, when a first measured time is reached, if the falling edge in a next cycle of the turn-on signal has not arrived, reducing a turn-on time or a turn-off time of the first switch for fixing a frequency of the switching circuit; step S203, when the falling edge in the next cycle of the turn-on signal has arrived before the first measured time is reached, increasing the turn-on time or the turn-off time of the first switch for fixing the frequency of the switching circuit.

A Third Embodiment

Figure 6:
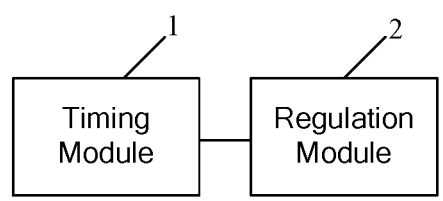
FIG. 6 is a block diagram of a switching circuit according to an embodiment of the disclosure.

The embodiment of the present disclosure provides a device for the switching circuit comprising a switching circuit and a control circuit, the control circuit is used for the switching circuit operated under continuous conduction mode, the switching circuit comprises a first switch and transforms an input voltage into an output voltage for driving a load by turning the first switch on and off. As shown in FIG. 6, the control circuit comprises a time module 1, which starts time measuring at a rising edge of a turn-on signal of the first switch, and a regulation module 2 connected with the timing module 1, which is used to reduce a turn-on time or a turn-off time of the first switch for fixing a frequency of the switching circuit if the rising edge in a next cycle of the turn-on signal has not arrived when a first measured time is reached and to increase the turn-on time or the turn-off time of the first switch for fixing the frequency of the switching circuit if the rising edge in the next cycle of the turn-on signal has arrived before the first measured time is reached.

The circuit for controlling the switching circuit provided by the embodiment of the disclosure includes the above circuit structure, so that the timing module 1 is able to start time measuring at the rising edge of the turn-on signal of the first switch, and the regulation module 2 reduces the turn-on time or the turn-off time of the first switch for obtaining the constant frequency of the switching circuit if the rising edge in the next cycle of the turn-on signal of the first switch has not arrived when the measured time reaches the first measured time, and increases the turn-on time or the turn-off time of the first switch for obtaining the constant frequency when the rising edge in the next cycle of the turn-on signal of the first switch has arrived and the measured time doesn't reach the first measured time. Therefore, the relationship between the input voltage and the output voltage according to the control circuit for the switching circuit provided by the embodiment of the present disclosure is not required to satisfy specific conditions for fixing the frequency of the switching circuit, thus the application range of the control circuit for the switching circuit provided by the embodiments of the present disclosure is extended.

Figure 7:
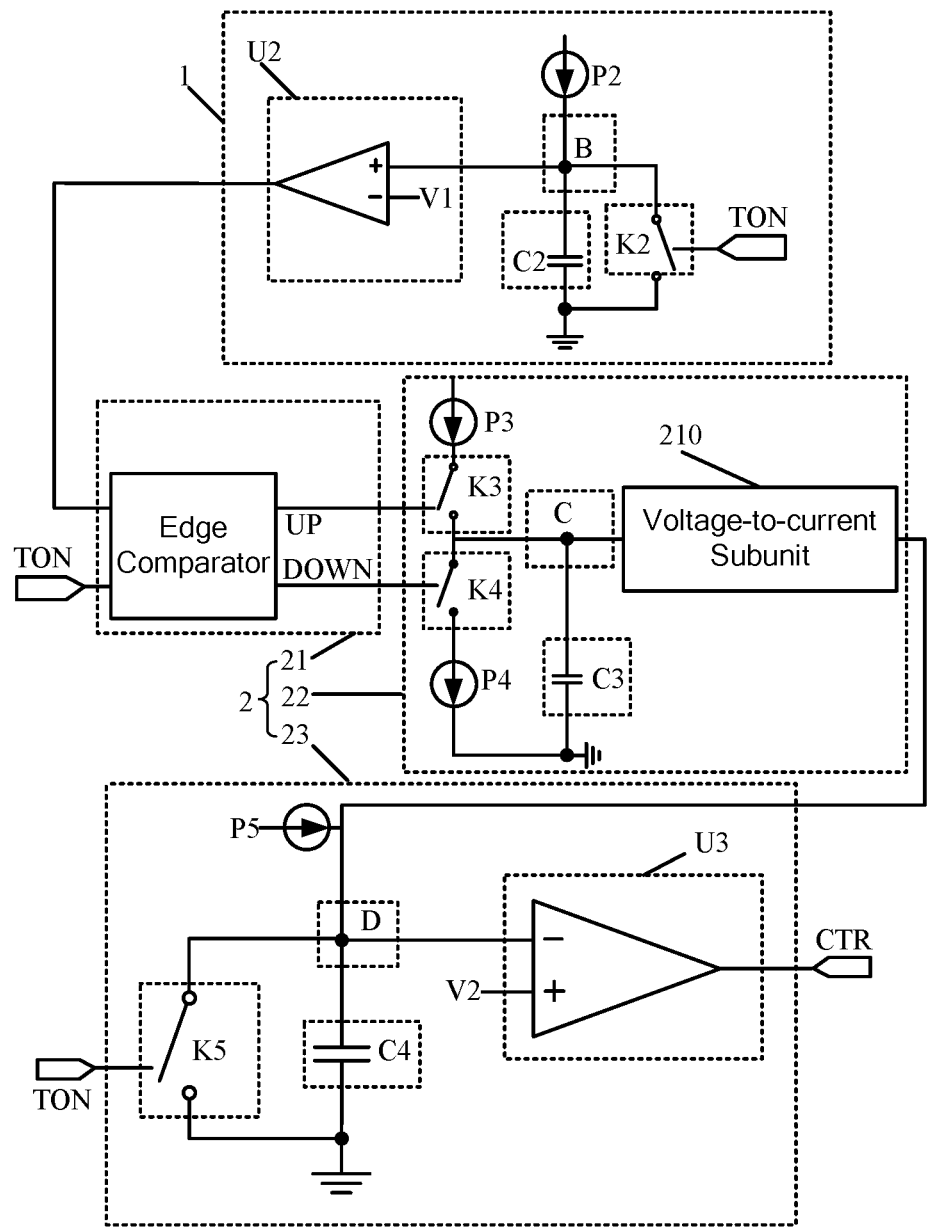
FIG. 7 is a second circuit diagram of a control circuit for the switching circuit according to an embodiment of the disclosure.

Specifically, the timing module 1 can be realized in various ways, one skilled in the art can implement the timing module based on actual needs. As an example, as shown in FIG. 7, the timing module comprises a second switch K2, a second capacitor C2, a second voltage comparator U2 and a second current source P2, a control terminal of the second switch K2 receives the turn-on signal TON of the first switch, a first terminal of the second switch K2 is grounded, a node connected with a second terminal of the second switch K2 is marked as a second node B; the second node B is coupled with the second current source P2, a first input terminal of the second voltage comparator U2 and a first terminal of the second capacitor C2, respectively, a second terminal of the second capacitor C2 is grounded, a voltage of a second input terminal of the second voltage comparator U2 is a first reference voltage V1, the first reference voltage V1 is the same with a voltage of the second node B when the first measured time is equal to a predetermined value of a switching cycle of the turn-on signal TON of the first switch. According to the circuit structure described above, it can be known that the voltage of the second node B, a voltage of the first electrode of the second capacitor C2 and a voltage of a first input terminal of the second voltage comparator U2 are the same. For ease of description, the voltage of the first electrode of the second capacitor C2 and the voltage of the first input terminal of the second voltage comparator U2 are represented by the voltage of the second node B below.

In the following description, an operating process of the timing module 1 with the above circuit structure is described based on an example, in which the first input terminal of the second comparator U2 is a non-inverting terminal, the second input terminal of the second comparator U2 is an inverting terminal, and the second voltage comparator U2 outputs a high-level voltage when a voltage of the non-inverting terminal is higher than a voltage of the inverting terminal. Specifically, when the rising edge of the turn-on signal of the first switch arrives, the second switch K2 is kept to be conductive for a certain time (for example, 30 ns), which is much less than the cycle of the turn-on signal TON of the first switch, then the second switch K2 is turned off, and at this time, the first electrode of the second capacitor C2 begins to be charged by the second current source P2, until the rising edge in the next operating cycle of the turn-on signal TON of the first switch arrives, the second switch K2 is turned on again for a certain time, and then the operating process of the previous operating cycle is repeated. That is, the first electrode of the second capacitor C2 begins to be charged at the beginning of the first measured time and stops being charged at the end of the first measured time, i.e., at the end of the first measured time, the voltage of the second node B reaches its maximum value.

Figure 8:
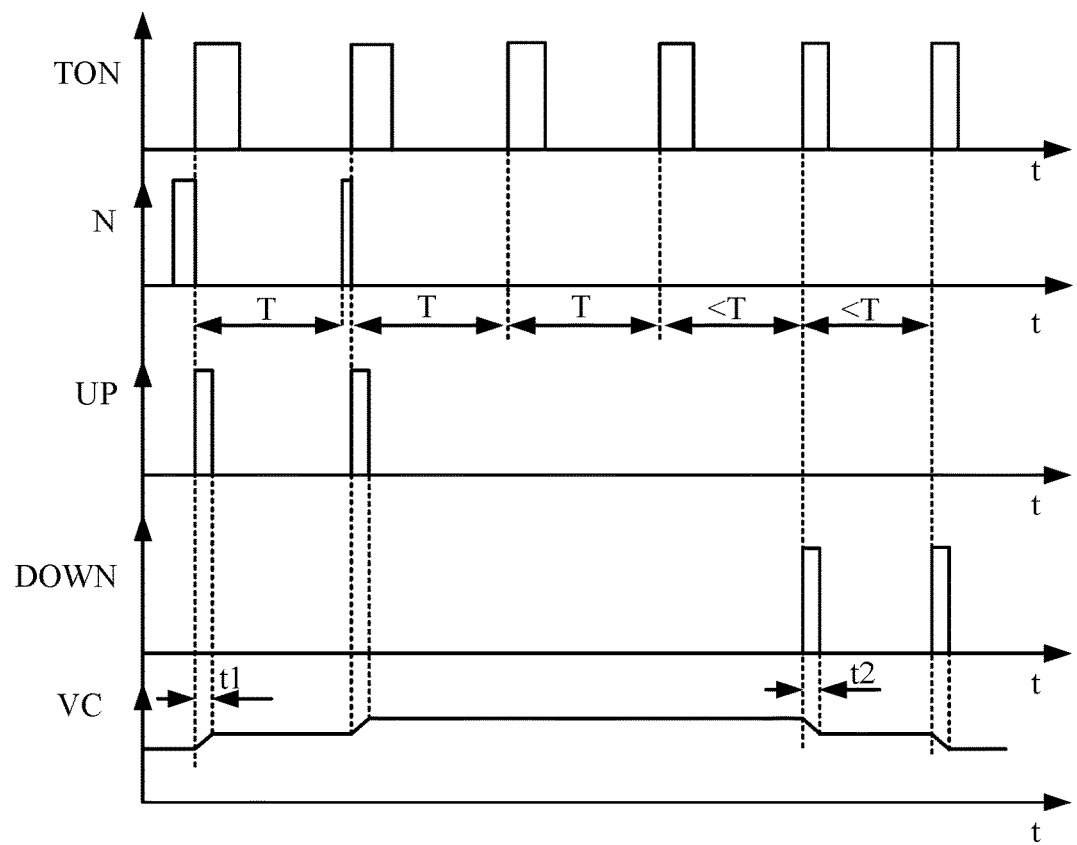
FIG. 8 is a timing diagram of a switching circuit according to an embodiment of the disclosure.

The first reference voltage V1 is the same with the voltage of the second node B when the first measured time is the same with the predetermined value of the cycle of the turn-on signal TON of the first switch, therefore, as shown in FIG. 8, when the first measured time is less than the predetermined value T of the cycle of the turn-on signal TON of the first switch, the voltage of the second node B is lower than the first reference voltage V1 at the end of the first measured time, and at this time, the output signal N of the second voltage comparator U2 is at low level. When the first measured time is longer than the predetermined value T of the cycle of the turn-on signal TON of the first switch, the voltage of the second node B is higher than the first reference voltage V1 at the end of the first measured time, and at this time, the output signal N of the second voltage comparator U2 is at high level. When the first measured time is the same with the predetermined value T of the cycle of the turn-on signal TON of the first switch, the voltage of the second node B is equal to the first reference voltage V1 at the end of the first measured time, and at this time, the output signal N of the second voltage comparator U2 just turns from low level to high level, i.e., a rising edge of the output signal N just arrives. It should be noted that, the abscissa of the timing diagram shown in FIG. 8 corresponding to the signals represents time t.

Furthermore, the regulation module 2 can also be realized in various ways, one skilled in the art can implement the timing module based on actual needs. As an example shown in FIG. 7, the regulation module 2 comprises an edge comparator 21 having a first input terminal connected with the output terminal of the second voltage comparator U2 and a second input terminal receiving the turn-on signal TON of the first switch. Specifically, when the arriving of the rising edge of the output signal of the second comparator U2 is detected by the edge comparator 21, and the rising edge in the next operating cycle of the turn-on signal TON of the first switch has not arrived, the rising edge in the next cycle of the turn-on signal of the first switch doesn't arrive when the time measured by the timing module 1 reaches the first measured time. Specifically, when the arriving of the rising edge of the turn-on signal TON of the second comparator U2 is detected by the edge comparator 21, and the rising edge of the output signal of the second comparator U2 has not arrived, the rising edge in the next cycle of the turn-on signal of the first switch arrives before the time measured by the timing module 1 reaches the first measured time. When the edge comparator 21 detected that the rising edge of the turn-on signal TON of the first switch and the rising edge of the output signal of the second voltage comparator U2 arrives at the same time, the time measured by the timing module 1 reaches the first measured time, the rising edge in the next cycle of the turn-on signal of the first switch just arrives.

As shown in FIG. 7, the regulation module 2 further comprises an on-time regulating unit 22 and an on-time controlling unit 23, wherein the on-time regulating unit 22 is connected with the edge comparator 21 and an output current of the on-time regulating unit 22 is adjusted in accordance with the output signal of the edge comparator 21. The on-time controlling unit 23 is connected with the on-time regulating unit 22, the output signal of the on-time controlling unit 23 is adjusted in accordance with the adjusted output current of the on-time regulating unit 22.

Specifically, the on-time regulating unit 22 can be realized in various ways, one skilled in the art can reasonably implement the on-time regulating unit based on actual needs. As an example shown in FIG. 7, the edge comparator 21 has a first output terminal and a second output terminal, the on-time regulating unit 22 comprises a third switch K3, a third current source P3, a fourth switch K4, a fourth current source P4, a third capacitor C3 and a voltage-to-current transforming subunit 210. Wherein, a control terminal of the third switch K3 is connected with the first output terminal UP of the edge comparator 21, a first terminal of the third switch K3 is connected with the third current source P3, a node connected with a second terminal of the third switch K3 is marked as a third node C, a control terminal of the fourth switch K4 is connected with the second output terminal DOWN of the edge comparator 21, a first terminal of the fourth switch K4 is grounded through the fourth current source P4, a second terminal of the fourth switch K4 is connected with the third node C, a first electrode of the third capacitor C3 is connected with the third node C, a second electrode of the third capacitor C3 is grounded, an input terminal of the voltage-to-current transforming subunit 210 is connected with the third node C.

Specifically, the on-time controlling unit 23 can be realized in various ways, one skilled in the art can reasonably achieve the on-time controlling unit based on actual needs. As an example shown in FIG. 7, the on-time controlling unit 23 comprises a fifth switch K5, a fourth capacitor C4 and a third voltage comparator U3. Wherein, a control terminal of the fifth switch K5 receives the turn-on signal TON of the first switch, a first terminal of the fifth switch is grounded, a node connected with a second terminal of the fifth switch K5 is marked as a fourth node D, the fourth node D is connected with an output terminal of the voltage-to-current transforming subunit 210, a first input terminal of the third voltage comparator U3 and a first electrode of the fourth capacitor C4, respectively, a second electrode of the fourth capacitor C4 is grounded, a voltage of a second input terminal of the third comparator U3 is a second reference voltage V2.

In the following description, an operating process of the regulation module 2 with the above circuit structure is described based on an example, in which the first input terminal of the third voltage comparator U3 is an inverting terminal, the second input terminal of the third voltage comparator U3 is a non-inverting terminal, and the third voltage comparator U3 outputs a high-level voltage when a voltage of the non-inverting terminal is higher than a voltage of the inverting terminal. As shown in FIG. 8, when the edge comparator 21 determines that the time measured by the timing module 1 reaches the first measured time, and the rising edge in the next cycle of the turn-on signal of the first switch has not arrived, the first output terminal UP of the edge comparator 21 turns on the third switch K3 for a period of time (for example, the period of time is t1), then turns off the third switch K3, the second output terminal DOWN controls the fourth switch K4 to be turned off all along, and the first electrode of the third capacitor C3 is charged by the third current source P3 when the third switch K3 is conductive, so that the voltage VC of the third node C is increased, the output current of the voltage-to-current transforming subunit 210 is transformed in accordance with the increased voltage VC of the third node C in a certain proportion by the voltage-to-current transforming subunit 210, thus the output current of the voltage-to-current transforming subunit 210 is increased. When the arriving of the rising edge in the next cycle of the turn-on signal of the first switch is determined by the edge comparator 21, and the measured time obtained by the timing module 1 doesn't reach the first measured time, the first output terminal UP of the edge comparator 21 turns off the third switch all along, the second output terminal DOWN of the edge comparator 21 turns on the fourth switch for a period of time (for example, the period of time is t2), then turns off the fourth switch K4, part of the electric charges on the first electrode of the third capacitor C3 is released, so that the voltage VC of the third node C is reduced, the output current of the voltage-to-current transforming subunit 210 is transformed in accordance with the reduced voltage VC of the third node in a certain proportion by the voltage-to-current transforming subunit 210, thus the output current of the voltage-to-current transforming subunit 210 is reduced. It should be noted that the turn-on time t1 of the third switch K3 and the turn-on time t2 of the fourth switch K4 can be chosen reasonably based on actual needs, for example, the turn-on time t1 and the turn-on time t2 can be the same, that is, t1=t2.

Moreover, the operating principle of the on-time controlling unit 23 can refer to the relevant operating principle of the control circuit for the switching circuit in the first embodiment, which will not be repeated here. According to the operating principle of the control circuit for the switching circuit in the first embodiment, it can be known that, when the output current of the voltage-to-current transforming subunit 210 is increased, the time for the voltage of the fourth node D to reach the second reference voltage V2 is reduced, thus the falling edge of the output signal of the third voltage comparator U3 arrives a certain time earlier, so that the control signal CTR of the turn-on signal TON of the first switch may make the rising edge in the next operating cycle of the first switch arrive in advance in accordance with the falling edge of the output signal of the third voltage comparator U3, which makes the cycle of the turn-on signal TON of the first switch and the predetermined value T of the cycle of the turn-on signal TON of the first switch equal or keeps the difference between the cycle of the turn-on signal TON of the first switch and the predetermined value T of the cycle of the turn-on signal TON of the first switch in a certain error range.

When the output current of the voltage-to-current transforming subunit 210 is reduced, the time for the voltage of the fourth node D to reach the second reference voltage V2 is increased, thus the falling edge of the output signal of the third voltage comparator U3 arrives with a certain time delay, so that the control signal CTR of the turn-on signal TON of the first switch delays the rising edge in the next operating cycle of the first switch for a certain time in accordance with the falling edge of the output signal of the third voltage comparator U3, which makes the cycle of the turn-on signal TON of the first switch the same with the predetermined value T of the cycle of the turn-on signal TON of the first switch or keeps the difference between the cycle of the turn-on signal TON of the first switch and the predetermined value T of the cycle of the turn-on signal TON of the first switch in a certain error range.

As shown in FIG. 7, the on-time controlling unit 23 further comprises a fifth current source P5 connected with the fourth node D, the current of the fifth current source P5 is (M×Vina), the second reference voltage V2 is equal to Vouta, wherein M is a fixed constant, Vina is the input voltage of the switching circuit, Vouta is the output voltage of the switching circuit, therefore, the cycle of the turn-on signal of the first switch is approximate to the predetermined value T of the cycle of the turn-on signal of the first switch when the switching circuit is at an initial state for just starting to operate, which speeds up the process of adjusting the cycle of the turn-on signal TON of the first switch. It should be known that, the function for fixing the frequency of the switching circuit, which is achieved by the control circuit for the switching circuit provided by the embodiments of the present disclosure, can be realized without the fifth current source P5.

Moreover, according to the above description, it can be known that the control circuit for the switching circuit is able to adjust the cycle of the turn-on signal TON of the first switch by use of the output current of the on-time regulating unit 22, therefore, although there's a delay generated by the third voltage comparator U3 in the on-time controlling unit 23, the delay of the third voltage comparator U3 can be compensated properly by use of the on-time regulating unit 22, which eliminates the error issue caused by the delay of the third voltage comparator U3. Especially, when the switching circuit is a buck circuit, and the delay of the third voltage comparator U3 is in tens of nanoseconds, if the turn-on time of the first switch is also in tens of nanoseconds, the control circuit for the switching circuit provided by the embodiments of the present disclosure can obviously eliminate the error issue caused by the delay of the third voltage comparator U3.

Besides, the embodiment of the present disclosure provides a control circuit for the switching circuit, the control circuit is included in a switching circuit operated under continuous conduction mode, the switching circuit comprises a first switch, the switching circuit transforms an input voltage into an output voltage for driving a load by turning the first switch on and off, the control circuit comprises: a time module, which starts time measuring at a falling edge of a turn-on signal of the first switch, and a regulation module connected with the timing module, which is used to reduce a turn-on time or a turn-off time of the first switch for fixing a frequency of the switching circuit if the falling edge in a next cycle of the turn-on signal has not arrived when a first measured time is reached and to increase the turn-on time or the turn-off time of the first switch for fixing the frequency of the switching circuit when the falling edge in the next cycle of the turn-on signal arrives before the first measured time is reached. It should be known that, the detailed structures of the above timing module and the regulation module of the control circuit for the switching circuit can be referred to the above description, and will not be repeated here.

The detailed descriptions of specific embodiment of the present invention have been presented, but are not intended to limit the invention to the precise forms disclosed. It will be readily apparent to one skilled in the art that many modifications and changes may be made in the present invention. Accordingly, the protection scope of the disclosure should be defined by attached claims.

What is claimed is:

1. A control circuit for a switching circuit, which is used to control the switching circuit operated under continuous conduction mode, wherein the switching circuit comprises a first switch and transforms an input voltage into an output voltage for driving loads by turning the first switch on and off, comprising:
    a timing module configured to start measuring time at a rising edge of a turn-on signal of the first switch;
    a regulation module being connected with the timing module and configured to reduce a turn-on time or a turn-off time of the first switch for fixing a frequency of the switching circuit when a first measured time is reached and the rising edge in a next cycle of the turn-on signal has not arrived, and to increase the turn-on time or the turn-off time of the first switch for fixing the frequency of the switching circuit when the rising edge in the next cycle of the turn-on signal arrives but the first measured time is not reached,
    wherein the first measured time and a predetermined time of a switching cycle of the turn-on signal are the same within a certain error range,
    wherein the timing module comprises a second switch, a second capacitor, a second voltage comparator and a second current source,
    a control terminal of the second switch receives the turn-on signal of the first switch, a first terminal of the second switch is grounded, a second node is a node connected with a second terminal of the second switch; the second node is coupled with the second current source, a first input terminal of the second voltage comparator and a first terminal of the second capacitor, respectively, a second terminal of the second capacitor is grounded, a voltage of a second input terminal of the second voltage comparator is a first reference voltage, wherein the first reference voltage is the same with a voltage of the second node at the time when the first measured time is equal to the predetermined time of a switching cycle of the turn-on signal of the first switch,
    wherein the regulation module comprises an edge comparator which has a first input terminal connected with an output terminal of the second voltage comparator to receive said output signal and a second input terminal for receiving the turn-on signal of the first switch.

2. The control circuit for the switching circuit according to claim 1, wherein the regulation module further comprises an on-time regulating unit and an on-time controlling unit, wherein the on-time regulating unit is connected with the edge comparator and an output current of the on-time regulating unit is adjusted in accordance with an output signal of the edge comparator, the on-time controlling unit is coupled with the on-time regulating unit and an output signal of the on-time controlling unit is adjusted in accordance with the adjusted output current of the on-time regulating unit.

3. A device of a switching circuit, comprising a control circuit for the switching circuit according to the claim 1.

4. A device of a switching circuit, comprising a control circuit for the switching circuit according to the claim 2.

5. The control circuit for the switching circuit according to claim 2, wherein the edge comparator comprises a first output terminal and a second output terminal, the on-time regulating unit comprises a third switch, a third current source, a fourth switch, a fourth current source, a third capacitor and a voltage-to-current transforming subunit,
    a control terminal of the third switch is connected with the first output terminal of the edge comparator, a first terminal of the third switch is connected with the third current source, a third node is a node connected with a second terminal of the third switch, a control terminal of the fourth switch is connected with the second output terminal of the edge comparator, a first terminal of the fourth switch is grounded through the fourth current source, a second terminal of the fourth switch is connected with the third node, a first electrode of the third capacitor is connected with the third node, a second electrode of the third capacitor is grounded, an input terminal of the voltage-to-current transforming subunit is connected with the third node.

6. A device of a switching circuit, comprising a control circuit for the switching circuit according to the claim 5.

7. The control circuit for the switching circuit according to claim 5, wherein the on-time controlling unit comprises a fifth switch, a fourth capacitor, and a third voltage comparator, wherein
    a control terminal of the fifth switch receives the turn-on signal of the first switch, the first terminal of the fifth switch is grounded, a fourth node is a node connected with a second terminal of the fifth switch, the fourth node is connected with an output terminal of the voltage-to-current transforming subunit, a first input terminal of the third voltage comparator and a first electrode of the fourth capacitor, respectively, a second electrode of the fourth capacitor is grounded, a voltage of a second input terminal of the third comparator is a second reference voltage.

8. A device of a switching circuit, comprising a control circuit for the switching circuit according to the claim 7.

9. The control circuit for the switching circuit according to claim 7, wherein the on-time controlling unit further comprises a fifth current source connected with the fourth node, wherein a current of the fifth current source is (M*Vina), the second reference voltage is equal to Vouta, wherein M is a fixed constant, Vina is an input voltage of the switching circuit, Vouta is an output voltage of the switching circuit.

10. A device of a switching circuit, comprising a control circuit for the switching circuit according to the claim 9.

11. A control circuit for a switching circuit, which is used to control the switching circuit operated under continuous conduction mode, wherein the switching circuit comprises a first switch and transforms an input voltage into an output voltage for driving loads by turning the first switch on and off, comprising:

a timing module configured to start measuring time at a falling edge of a turn-on signal of the first switch;

a regulation module being connected with the timing module and configured to reduce a turn-on time or a turn-off time of the first switch when a first measured time is reached and the falling edge in a next cycle of the turn-on signal has not arrived, and to increase the turn-on time or the turn-off time of the first switch when the falling edge in the next cycle of the turn-on signal arrives but the first measured time is not reached, wherein the first measured time and a predetermined time of a switching cycle of the turn-on signal are the same within a certain error range wherein the timing module comprises a second switch, a second capacitor, a second voltage comparator and a second current source, a control terminal of the second switch receives the turn-on signal of the first switch, a first terminal of the second switch is grounded, a second node is a node connected with a second terminal of the second switch; the second node is coupled with the second current source, a first input terminal of the second voltage comparator and a first terminal of the second capacitor, respectively, a second terminal of the second capacitor is grounded, a voltage of a second input terminal of the second voltage comparator is a first reference voltage, wherein the first reference voltage is the same with a voltage of the second node at the time when the first measured time is equal to the predetermined time of a switching cycle of the turn-on signal of the first switch, wherein the regulation module comprises an edge comparator which has a first input terminal connected with an output terminal of the second voltage comparator to receive said output signal and a second input terminal for receiving the turn-on signal of the first switch.

12. A device of a switching circuit, comprising a control circuit for the switching circuit according to the claim 11.

\* \* \* \* \*